United States Patent [19]

Winkler et al.

[11] Patent Number: 4,683,638
[45] Date of Patent: Aug. 4, 1987

[54] MACHINE TOOL

[75] Inventors: Hans-Henning Winkler, Tuttlingen; Eugen Rütschle, Mühlheim, both of Fed. Rep. of Germany

[73] Assignee: Chiron-Werke GmbH, Tuttlingen, Fed. Rep. of Germany

[21] Appl. No.: 872,696

[22] Filed: Jun. 10, 1986

[30] Foreign Application Priority Data

Jun. 12, 1985 [DE] Fed. Rep. of Germany ....... 3521009

[51] Int. Cl.⁴ ............................................. B23Q 3/157
[52] U.S. Cl. ........................................ 29/568; 211/1.5
[58] Field of Search ................. 29/568, 26 A; 211/2.5

[56] References Cited

U.S. PATENT DOCUMENTS 4,546,533  10/1985  Hallbach ............................. 29/568

FOREIGN PATENT DOCUMENTS 163277   12/1985  European Pat. Off. ............. 29/568
2159552  6/1973   Fed. Rep. of Germany ........ 29/568
3233934  3/1984   Fed. Rep. of Germany ........ 29/568
144946   11/1980  Japan ..................................... 29/568
214535   12/1984  Japan ..................................... 29/568
668798   6/1979   U.S.S.R. ................................ 29/568

Primary Examiner—William R. Briggs
Attorney, Agent, or Firm—Pretty, Schroeder, Brueggemann & Clark

[57] ABSTRACT

A machine tool comprises a spindle stock (11) and a tool magazine (29) in which a plurality of tool-carrying toolholders (17) can be displaced along an endless path in a plane perpendicular to the axis (19) of the spindle stock (11). Two gripper arms (20, 20a) serve for transferring the toolholders (17) between withdrawal and/or loading positions (74) in the tool magazine (29), which are located on either side of the spindle stock (16), and a spindle position in a spindle nose (15) of the spindle stock (16). The endless path extends along a U shape, and a withdrawal or mounting position (74) is provided on each end (30', 30a') of the legs (30a) of the U. The spindle nose (15) is arranged in front of and below the ends (30', 30a') and rigidly connected with the tool magazine (29) in the direction of the axis (19).

14 Claims, 8 Drawing Figures

MACHINE TOOL

The present invention relates to a machine tool comprising a spindle stock, a tool magazine in which a plurality of tool-carrying toolholders can be displaced along an endless path in a plane perpendicular to the axis of the spindle stock, and two gripper arms for transferring the toolholders between withdrawal and/or loading positions in the tool magazine, which are located on either side of the spindle stock, and a spindle position in a spindle nose of the spindle stock.

A machine tool of this type has been known already from U.S. Pat. No. 3,200,492.

The known machine tool comprises a spindle stock which can be displaced only in the vertical direction and which is provided above a work table arranged for being displaced along two horizontal coordinates. Two tool magazines provided on either side of the spindle stock are rigidly connected with the latter. The two tool magazines exhibit substantially the configuration of a carrousel turning about an axis extending parallel to the spindle axis, and can be rotated in a horizontal plane in such a manner that a freely pre-selectable position at the outer periphery of the revolving table can be moved into a position adjacent a spindle nose of a spindle stock. Each of the carrousel-type magazines comprises a transfer slide which is arranged on a diameter of the perimeter defined by the caroussel-type magazine and which is arranged for being displaced, together with the tool, in a radial direction from the transfer position of the tool magazine into a spindle position, or vice versa. For exchanging the tool, one of the said transfer slides is advanced to withdraw the previously used tool from the spindle, whereafter the other slide is advanced to insert the new tool into the spindle. For introducing the tools into the holding fixture of the spindle nose, the latter must be moved in the vertical direction. After the new tool has been inserted into the holding fixture of the spindle nose, the latter moves a short way downwardly until the new tool gets into engagement with the workpiece.

This arrangement of the known machine tool is connected with a number of essential drawbacks. On the one hand, it is a disadvantage that the two caroussel-type magazines provided in the immediate neighborhood of the spindle nose require a considerable amount of space exactly at a point where sufficient room should be available to permit even big and bulky workpieces to be machined. On the other hand, it is a consequence of the configuration of the known machine tool that all tools contained in the two caroussel-type magazines remain in the direct neighborhood of the machining position so that drilling coolant splashing around and, above all, chips flying around may settle on the tools. There is, therefore, a risk of drilling coolant depositing on the taper of the tool holder and of small chips sticking to the deposited coolant, which may then lead to damage when the tool is inserted later into the spindle nose taper, because the taper surfaces of the toolholder facing each other are high-precision machined.

Another substantial disadvantage of the known machine tool resides in the fact that the desired advantage of a quick tool change limits the selection of the sequence of machining operations due to the fact that the tools are changed in alternately from the two magazines. If, for example, a tool A is present only in one of the two magazines, the operating sequences A-B-C-A would be impossible because due to the alternate use of tools from the two magazines one and the same tool can be used only at intervals of two, or any integral multiple of two, machining operations. However, if the beforementioned oprerating sequence were desired it would be necessary to keep the same tool A available in both magazines which would under extreme circumstances completely eliminate the advantage achievable by the known machine tool and its two optionally selectable tool magazines.

Finally, it is also a drawback of the known machine tool that the unidimensional movement of the transfer slides requires the spindle to be moved laterally for the tool change, which results in longer re-tooling times.

U.S. Pat. No. 4,182,021 describes another tool magazine in which the tools are transported by an endless chain conveyor along an approximately U-shaped path, and gripped in a transfer position by a tool-change gripper which transfers the tool to the spindle of a machine tool. However, this known magazine does not in any way make use of the particular geometry of the endless path, and the fact that the tools are picked up at a single position only deprives the shape of the endless path of this known magazine of any meaning whatsoever.

German Disclosure Document No. 21,63,499 describes another machine tool with automatic tool-changing device. This arrangement comprises also caroussel-type magazines on either side of a spindle, but the revolving axes of these magazines extend perpendicularly relative to the spindle axis. For changing the tool holders, two gripper arms are provided which turn the tools by 90° during their movement between the magazine position and the spindle position, or vice versa, so that this known machine tool requires relatively complex gripper elements at the tool-changing arms in order to prevent the toolholders from coming off the gripper elements during the changing operation.

From German Disclosure Document No. 17,52,605 another tool-chaning device for machine tools has been known in which a tool magazine is arranged at a distance behind the spindle stock with vertical spindle axis. The tool magazine comprises an endless chain conveyor whose oval path extends in a horizontal plane. The chain is equipped with pivoted fork-shaped holders carrying the toolholders with the tools inserted therein. Between the spindle stock and the tool magazine, which is arranged at a certain distance from the spindle stock, there is provided a horizontally extending transfer path along which a downwardly curved gripper arm can be displaced. For withdrawing a tool from the magazine, the gripper is moved back into the area of the tool magazine where it receives a toolholder at a given withdrawal position. The whole gripper arm, together with the toolholder, then advance along the transfer path until they reach a spindle position where the toolholder is inserted into the spindle.

The tool-changing device described by German Disclosure Document No. 17,52,605 provides the disadvantage that it requires much space because much room must be available behind the machine tool as such for the transport system and the separate magazine. In addition, the relatively long distance that has to be traversed by the gripper arm from the magazine to the spindle head leads to relatively long re-tooling times, in particular because only a single gripper arm is provided which has to remove the previously used tool first and to transfer it to the magazine where, after the magazine has been indexed to the next position, it can take over the new tool, advance to the spindle, and load the tool into the spindle.

U.S. Pat. No. 4,557,035 describes a machine tool in which a plurality of gripper arms are arranged in the manner of a carousel around a spindle stock with vertical spindle axis. Each of the said gripper arms is equipped with a specific toolholder/tool. The gripper arms comprise a linkage in the form of a parallelogram with the aid of which the tool holders can be moved from a magazine position located at a radial distance from the spindle axis into a spindle position. In addition, all gripper arms are arranged on a common sleeve which embraces the spindle stock and which can be vertically displaced thereon.

Although in the case of the machine tool according to U.S. Pat. No. 4,557,035 the re-tooling times are much shorter because all toolholders are arranged in the immediate neighborhood of the spindle, i.e. in a manner surrounding the spindle in the form of a carousel, the constructional input is quite considerable because each toolholder must be equipped with a separate gripper arm with a mechanical actuating system. In addition, this manner of magazining the tools limits the number of tools definitely, which means of course that a limited number of machining steps can be carried out only without changing the tools in the magazine.

The U.S. patent application Ser. No. 712,887 describes a machine tool having a spindle stock which can be moved along several axes and in which a tool magazine is arranged in a horizontal plane, likewise at a distance behind the spindle stock. Two transfer devices are arranged on either side of the spindle stock for transporting toolholders from the magazine into the area of the spindle stock. Two pendulum-type gripper arms with horizontal pivot axis are arranged at the front of the spindle stock so that a toolholder can be withdrawn from the spindle position, for example by the left gripper arm, and transferred to the left transfer device, while the right gripper arm may simultaneously withdraw the next tool from the right transfer device and insert it into the spindle position.

As compared to this, the present invention has for its object to improve a machine tool of the before-described type in such a manner that an even greater number of different tools can be changed in selectively and with minimum retooling times, without the free working space avaiable in the proximity of the spindle nose being restricted thereby.

This object is achieved according to the invention by an arrangement in which the endless path extends along a U shape, in which a withdrawal or mounting position is provided on each end of the legs of the said U, and in which the spindle nose is arranged in front of and below the said ends and rigidly connected with the tool magazine in the direction of the axis.

This arrangement solves the problem underlying the present invention completely and in a perfect manner.

For, giving the magazine the shape of a U or of a horseshoe provides the advantage that a very great number of toolholders can be stored in the magazine if the length of the legs of the U is selected appropriately, it being further of improtance that the endless path extends along both, the inside and the outside of the U. Thus, a number of typically 32 or even considerably more tools can be stored in the magazine without the lateral extension to the side of the spindle stock, and also to the front, becoming excessively large, as is the case with the two lateral carousel-type tool magazines used by the prior art. The spacing of the withdrawal and mounting positions from the spindle stock is selected in such a manner that on the one hand the retooling time required is reduced to a minimum because the small spacing can be bridged by a gripper arm, while on the other hand the spacing of the tool magazine from the spindle nose at the rear and on top is large enough to prevent the risk of soiling of the tool, in particular the toolholder tapers, the latter being arranged above the tools so that they are hardly accessible for splashing drilling coolant and chips flying around.

By "tapping" the U-shaped tool magazine at two positions the re-tooling times can once more be reduced considerably if the transfer of the toolholders along the endless path is controlled in a convenient manner. For, the tool magazine can be caused to revolve already shortly before completion of a machining operation so that the tool required next is available at the one of the two positions which now serves as the withdrawal position, and can be withdrawn by one of the two gripper arms. This operation is then immediately followed by a search run of the magazine which serves to find a vacant position for the toolholder to be withdrawn from the spindle at the other position which now serves as the loading position. Now, the gripper arm can withdraw the "previous" toolholder from the spindle and deposit it in the empty position, while the other gripper arm is already inserting the "new" toolholder into the spindle.

Finally, the measure to connect the tool magazine with the spindle nose rigidly in the direction of the spindle axis provides the advantage that a so-called "variable tool-changing plane" can be obtained which means that the tool-changing operation is generally independent of the coordinate position occupied by the spindle nose at the very moment when the tool is changed, and the magazine follows all movements of the spindle stock due to the rigid connection. Accordingly, the transfer between the spindle and the magazine positions can be effected without regard to the coordinate position which the spindle nose occupies at any given time with the result that the paths to be trasversed can be optimized, in particular shortened, regardless of the coordinate position given at any time.

According to a preferred embodiment of the invention, the axis of the head stock and the withdrawal or loading positions are provided in symmetrical arrangement at the ends of an isosceles triangle, and the transfer path of the gripper arms extends along the equal sides of the triangle, the angular position of the toolholders remaining unchanged during the transfer movement.

This feature provides the advantage that the symmetrically arranged transfer paths between the spindle on the one hand and the two positions of the tool magazine on the other hand are equal in length so that equal transfer times are achieved, too. The transfer of the toolholders in unchanged angular position ensures further that the driving groove on the toolholder remains always in a defined position so that during insertio of the toolholder into the spindle the driving groove always gets directly into engagement with the key provided at this point.

According to another preferred embodiment of the invention in which the spindle stock also moves along several coordinate axes, the gripper arms are provided with a linkage in the form of a parallelogram and are rigidly connected with the spindle stock in directions perpendicular to the latter's axis, but are movable in a direction parallel to the said axis.

This feature provides the advantage that the toolholders can be introduced into the spindle by means of a single actuating member, for example a piston and cylinder unit. To this end, the active gripper arm holds the toolholder in a position a short distance below the spindle, and the gripper arms are then moved up all together, until the toolholder engages the taper of the spindle stock. It is particularly preferred in this arrangement that the gripper arms are jointly held in this upper position by means of a tension spring and lowered, again jointly, against the action of the tension spring by means of a piston and cylinder unit only for unloading the toolholder.

According to certain embodiments of the invention, a conveyor chain is guided along the endless path and provided with pivoted holders for the toolholders, and two driving wheels for the conveyor chain, which are driven in synchronism, are arranged at the ends of the U.

This feature provides the advantage that the transfer of the toolholders is effected absolutely free from play, because being driven in synchronism at the two points of the endless path, at which withdrawal and loading is effected, excludes any play resulting from possible elongation of the chain. Accordingly, the tools occupy at the withdrawal points the exactly correct position which, preferably, has been determined by an incrementing sensor on the chain shaft.

According to a particularly preferred variant of this embodiment of the invention, the driving wheels are driven via an endless belt arranged in the form of a V, preferably a toothed belt or a chain, the driving wheels being arranged at the free ends of the legs of the V, and an additional driver and a roller provided at a distance from the latter being arranged at the point of intersection of the said legs.

This feature provides the advantage that the desired synchronous operation of the two driving wheels can be ensured in a simple manner with a single drive motor.

According to a preferred improvement of this variant, the roller takes the form of a tension pulley for the belt or the chain which can be displaced towards the driver.

This feature provides the advantage that the tension of the belt or the chain can be adjusted in a very simple manner if this should become necessary.

According to a further improvement of the last-mentioned variant, the driving wheels, the driver, the pulley and the belt are arranged in a V-shaped drive box.

This feature provides the advantage that the driving belt or the chain are protected in the hollow body formed by the drive box.

A particularly favorable effect is achieved with this embodiment of the invention when the free ends of the drive box carry the magazine by the latter's free legs and when the point of the V of the drive box is fastened at the spindle stock, the drive box and the magazine being preferably designed as self-supporting aluminium structures.

This feature provides the particular advantage of an especially light-weight construction which is of particular importance when the spindle stock is displaced in several coordinate directions because the spindle stock must entrain the magazine and the driving mechanism.

In still other embodiments of the invention, the toolholders are held on the U-shaped endless path of the magazine in fork-like holders whose open sides point away from the U, and a guide fixed to the magazine, preferably a wall of the magazine, extends along the endless path in front of the said open side, the said guide being provided with an opening at each of the withdrawal and loading positions.

This feature offers the advantage that withdrawing and loading of the toolholders is particularly easy because thanks to the drawer-like function of the fork-shaped holders, the toolholders can easily be introduced and withdrawn from the front. The guide fixed to the magazine ensures that the toolholders cannot slide off the fork-shaped holders undr the effect of the centrifugal force encountered when the bends of the U are passed at high speeds. Openings facilitating these operations are provided only at the withdrawal and loading positions.

A particular preferred arrangement is obtained in this embodiment of the invention when the opening is spanned by an arc-shaped portion forming the upper end of a scythe-shaped holding part which is mounted to pivot at its lower end.

This feature provides firstly the advantage that the opening at one withdrawal position can be closed immediately after withdrawal of the toolholder and that immediately thereafter a search run of the magazine can be carried out in the manner described before for finding an empty position for the toolholder to be unloaded from the spindle. Designing the holding part in scythe shape with a pivot axis provided at its lower end provides the advantage that the upper, arc-shaped portion can be pivoted away from the withdrawal or loading position practically tangentially, provided its lower portion is sufficiently long. The advantage of this is that a holder of the gripping arm may be positioned immediately in front of the withdrawal or loading position, without any risk of collision with the arc-shaped portion being pivoted away.

In still other embodiments of the invention, a slide arrangement fixed to the magazine extends perpendicularly relative to the endless path at the withdrawal and loading positions, which slide arrangement serves for moving toolholders out of unilaterally open, fork-shaped holders of the magazine into and out of a likewise fork-shaped holder of the gripper arm in the latter's magazine position.

This slide arrangement which can be operated relatively quickly provides the advantage that the transfer of the toolholder from the magazine into the gripper or vice versa is effected rapidly, with the result that the re-tooling times can be kept short.

This is true in particular when, according to a further improvement of this variant of the invention, the slide arrangement comprises a head having two portions arranged one behind the other in the direction of displacement and holding the toolholder positively in both directions of displacement.

For, if these portions—viewed in the direction of movement of the magazine—correspond to the contour of the toolholder, plus a little play, the head may remain in the paths of the toolholders during passage of the magazines so that it does not have to be moved into the transfer position for the transfer operation. In addition, this configuration of the head offers the advantage that transfer operations can be effected in both directions, i.e. into and out of the magazine. If the contour of the portions conforms in the manner described before to the outer contour of the toolholder which, as is generally known, is tapered at its upper end, the slide arrangement may assume a waiting position with its head moved out of the magazine, in which position the gripper arm advances the toolholder from below so that the toolholder which is to be inserted into the magazine is introduced between the portions of the head of the slide arrangement without hitting the latter.

According to a further improvement of this variant, the head portion pointing away from the gripper arm can be pivoted about an axis extending in parallel to the direction of displacement.

This feature provides the advantage that when the head is moved out of the magazine and the rear portion is at the same time pivoted away, the magazine can be loaded or discharged manually because in this position one has free access to the fork-like holders of the magazine.

Finally, a still other embodiment of the invention is preferred in which the magazine is surrounded by a wall which is closed all round, except for openings provided at the withdrawal and loading positions.

This feature provides the advantage that the tools and tool holders present in the magazine are perfectly protected from chips and splashing coolant, as are the transfer and drive units arranged in the magazine.

Other advantages of the invention will become apparent from the following specification and the attached drawing.

It goes without saying that the features that have been described above and that will be explained further below, can be used not only in the described combination, but also in any other combination, or separately, without leaving the scope of the invention.

Certain embodiments of the invention will be described hereafter in greater detail with reference to the drawing in which.

Figure 1:
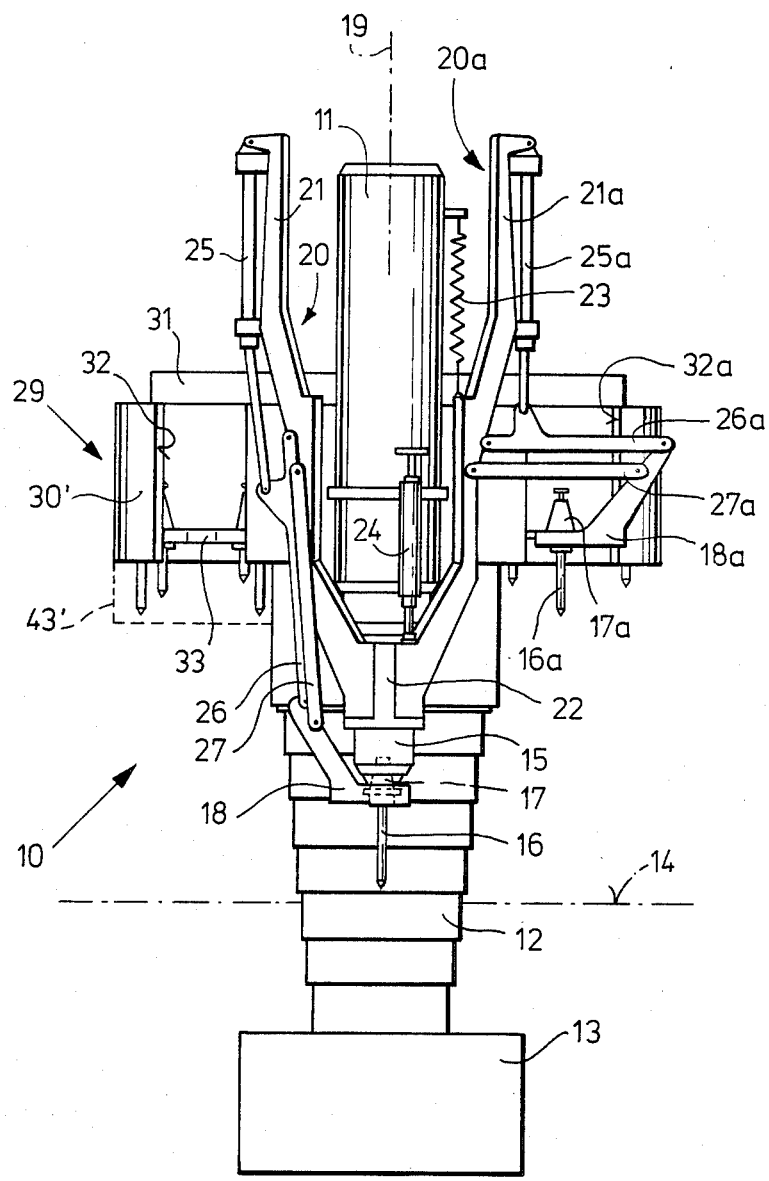
FIG. 1 shows a front view of an embodiment of a machine tool according to the invention.

FIG. 1 shows a machine tool which is generally designated by reference numral 10, comprising a spindle stock 11 arranged on a base 13 via vertical adjusting means 12 enclosed in a telescopic cover. The spindle stock 11 can be moved in two coordinate directions perpendicular to its vertical axis 19; however, the mechanisms required for this purpose are known as such and are, therefore, not shown in the figures for the sake of clarity.

A tool 16 held in a toolholder 17 is mounted in a spindle nose 15. The toolholder 17 in turn is held by a holder 18 of the gripper arm 20. The toolholder 17 may, for example, be designed to rotate in the holder 18 so that the holder 18 need not be removed from the toolholder 17 in the operating position of the latter during use of the tool 16.

The gripper arm 20 compriss a rigid portion 21 whose lower end is fastened to a sleeve 22 which can be displaced along the spindle nose in the direction of the vertical axis 19. The sleeve carries in addition another rigid portion 21a of another gripper arm 20a.

In its neutral position, the unit formed by the gripper arms 20, 20a and the sleeve 22 is drawn upwardly into the operating position of a toolholder shown in FIG. 1 by means of a tension spring 23 acting upon one of the rigid parts 21, 21a, and also upon the spindle stock 11. For changing the tool, a first piston and cylinder unit 24 is operated whose upper end is connected with the spindle stock 11, while its lower end is connected with the sleeve 22 or one of the rigid parts 21, 21a. The first piston and cylinder unit 24 urges the sleeve 22 upwardly so that the tool holder 17 comes out of engagement with the spindle nose 15.

The holders 18, 18a of the gripper arms 20, 20a are connected with the rigid parts 21 and 21a via linkages 26, 27 and 26a, 27a in the form of parallelograms. The linkages 26, 27 and 26a, 27a act by the one end upon the rigid part 21 or 21a and by their other end upon one of the links 26 or 26a.

While in the extended position of the second piston and cylinder unit 25, as shown in the left half of FIG. 1, the gripper arm 20 brings the toolholder 17 into the spindle position, the toolholder 17a is brought into a so-called magazine position above the spindle nose 15 when the second piston and cylinder unit 25a is in its retracted position.

Figure 2:
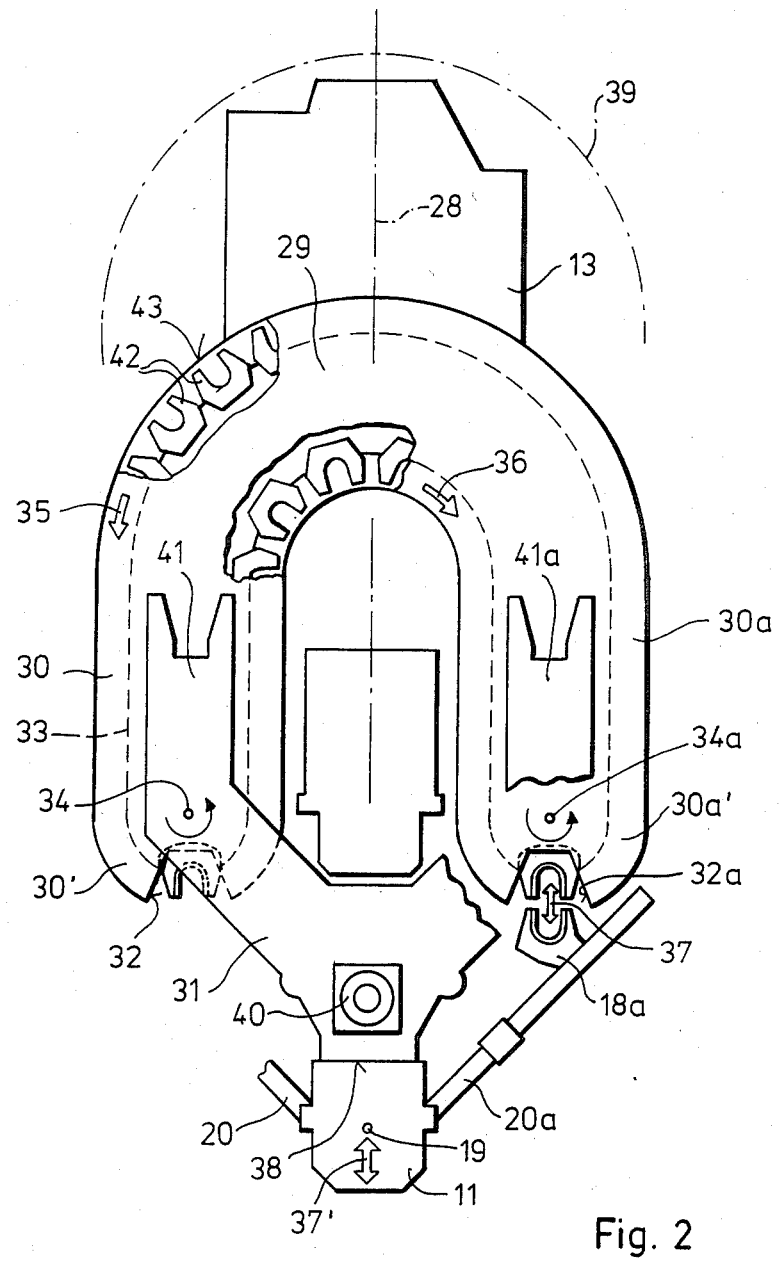
FIG. 2 shows a top view of the machine represented in FIG. 1, partly broken away and partly simplified.

As can be seen clearly in the top view of FIG. 2, the gripper arms 20, 20a are both inclined to the rear by approx. 45° so that they enclose between themselves an angle of approx. 90°. When the second piston and cylinder units 25 and 25a move from the spindle position into the magazine position, or vice versa, the toolholders 17 and 17a move accordingly along a transfer path from an "upper rear" to a "lower forward" position, or vice versa. Thanks to the use of the linkages 26, 27 and 26a, 27a in parallelogram form, the vertical alignment of the toolholder 17 or 17a is, however, maintained during this movement, as is their rotary position relative to their vertical axis.

As can be further seen in FIG. 2, a magazine 29 which in the top view of FIG. 2 exhibits the form of a U or of a horseshoe is arranged symmetrically relative to an axis 28 extending perpendicularly to the vertical axis 19 of the spindle stock 11. The legs of the magazine 29 are designated by 30 and 30a, their ends by 30' and 30a'.

Mounted on the magazine 29, and fixed thereto, is a V-shaped drive box 31 which is connected with the spindle stock 11 in a connection plane, and by its legs 41, 41a with the magazine 29. The drive box 31 and the magazine 29 form, preferably, a self-supporting aluminium structure in cantilevered form which is rigidly connected with the spindle stock 11 in the connection plane 38 so that it follows every movement of the spindle stock 11 along the three coordinate axes. The contour 39 shows by way of example the position assumed by the magazine 29 when the spindle stock 11 is in its extreme rear position.

The ends 30', 30a' of the magazine 29 are provide with openings 32, 32a through which toolholders 17, 17a can be withdrawn from or inserted into the magazine 29. The magazine 29 includes a likewise U-shaped endless path in the form of an endless conveyor chain 33 which is driven via the drive shafts 34 or 34a at the ends 30' or 30a', as will be explained hereafter in greater detail with reference to FIGS. 3 and 4.

When the drive shafts 34 and 34a rotate in the direction indicated by the arrows, fork-shaped holders 42 move in the direction indicated by arrows 35, 36 along the endless path defined by the conveyor chain 33. When the direction of rotation is reversed, the direction of arrows 35, 36 is of course reversed, too.

The fork-shaped holders 42 are adapted to receive toolholders 17, 17a which can be inserted from the front in the manner of a drawer.

In order to ensure that the toolholders 17, 17a cannot come off their holders 42 in the bends under the effect of the centrifugal force when the conveyor chain 33 moves at high speed, a guide taking the form of a wall 43 of the magazine 29 is provided in front of the opening of the forks formed by the holders 42. This guide is interrupted only in the area of the openings 32 and 32a, as will be explained in greater detail further below, in connection with FIGS. 5 and 6.

In FIG. 1 it can be seen that the wall 43 may be extended at 43' downwardly and laterally until the magazine 29 is fully enclosed, except for the openings 32 and 32a. This protects the tools 16, 16a which in the representation of FIG. 1 project downwardly from the magazine 29, as well as the conveyor chain 39 with its drive units, from chips flying around and splashing coolant.

Figure 3:
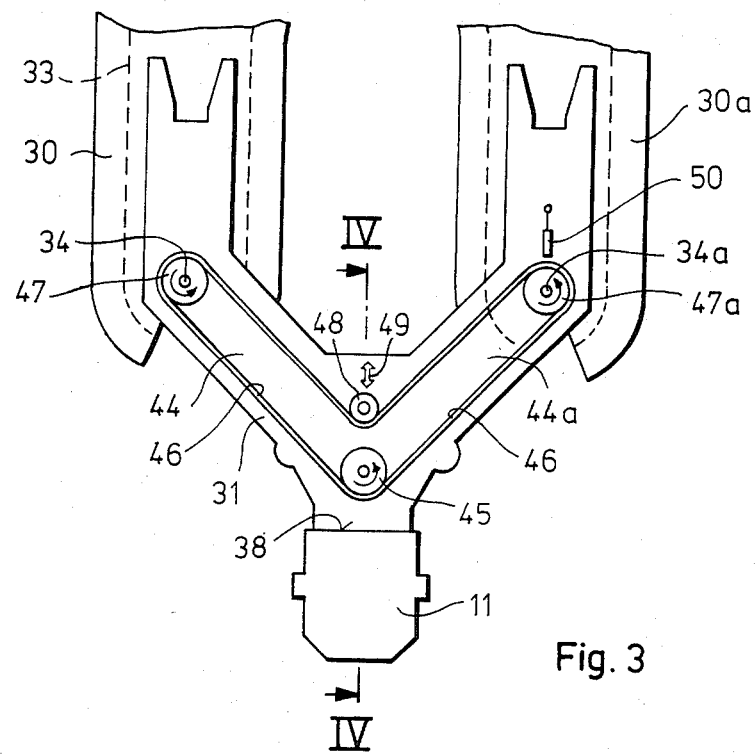
FIG. 3 shows a diagrammatic top view of the drive system for a magazine according to the invention.

In FIG. 2, there can be seen behind the spindle stock 11 a drive motor 40 for driving a driver which in FIG. 3 is indicated by reference numeral 45. The driver 45 is located at the lowermost point of an endless toothed belt 46 arranged in V shape and driving, at the ends of the legs of the V, driving wheels 47 and 47a which are connected with the drive shafts 34 and 34a to rotate therewith. A tension roller 48 which can be seen in FIG. 3 at the point of the V, above the upper strand, is arranged for displacement in the direction indicated by arrow 49.

Figure 4:
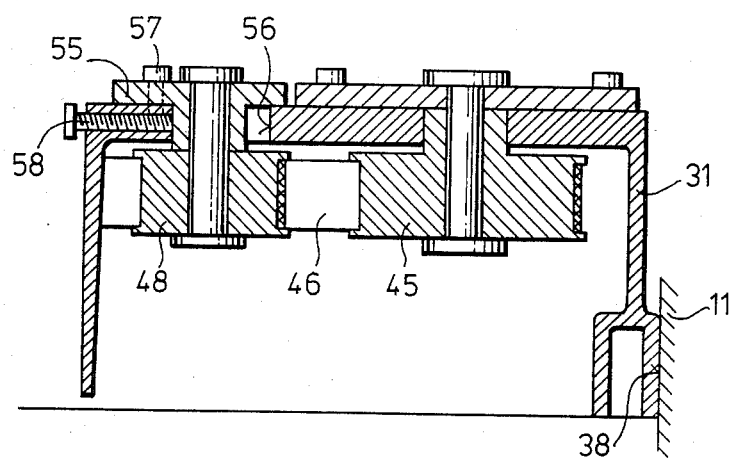
FIG. 4 shows a section taken along line IV—IV in FIG. 3.

The sectional representation of FIG. 4 illustrates on the one hand the design of the drive box 31, which is closed at least on top but may be closed also at the bottom, except for the passage openings required for the drive shafts 34 and 34a. The tension roller 48 is held by an adjusting piece 55 which can be displaced in an oblong hole 56 in the direction indicated by arrow 49 in FIG. 3. A fixing screw 57 and an adjusting screw 58 serve to adjust the adjusting piece and to fix it in position. This permits the tension of the toothed belt 46, which may of course also take the form of a chain of the like, to be adjusted within the required limits.

In FIG. 3, a sensor 50 can be seen which is located near the driving wheel 47 a and which, being an incrementing sensor, detects the rotary position occupied by the driving wheel 47a at any given time to derive therefrom the position of the toolholders 17, 17a in the holders 42 of the conveyor chain 33. A control device not shown in detail in the figures permits, accordingly, the momentary position occupied by the toolholders 17, 17a to be detected and the desired position to be selected by a suitable search run.

Figure 5:
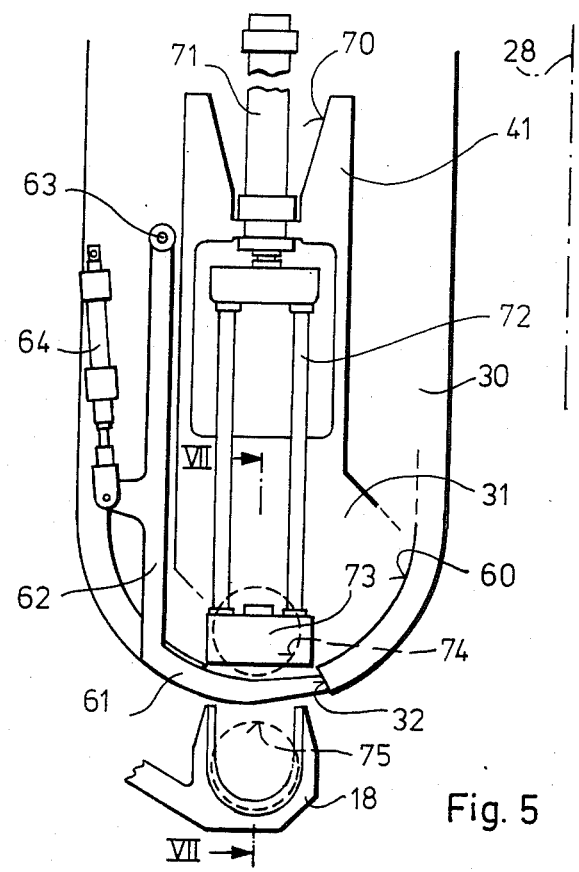
FIGS. 5 and 6 show two diagrammatic representations of operating positions of a magazine used according to the invention.
Figure 6:
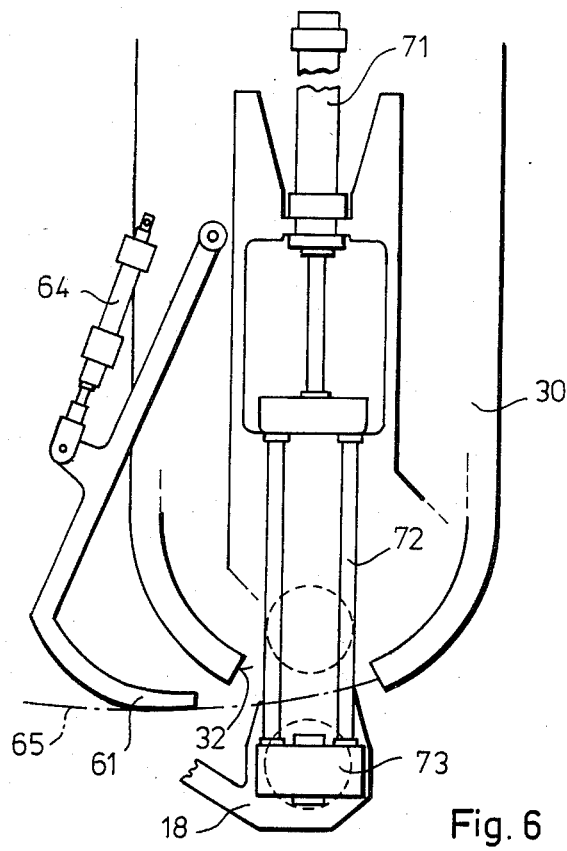

FIGS. 5 and 6 illustrate the situation as toolholders 17, 17a are transferred from holders 42 in the magazine 29 to the holder 18 of the gripper arms 20, 20a.

In FIG. 5, the line 60 indicates an outer path of movement, i.e. the locus along which the outer contour of the toolholders 17, 17a moves during operation of the conveyor chain 32. The path 60 is limited, as mentioned already in connection with FIG. 2, by a guide to prevent the toolholders 17, 17a from coming off the holders 42 of the magazine 29. The guide arranged along the path 60 ends at the opening 32 where an arc-shaped portion 61 of a scythe-shaped retaining piece 62 can be seen. The piece 62 is pivoted about an axis 63 and can be rotated about the said axis 63 by means of a third piston and cylinder unit 64.

The ends of the free legs 41, 41a of the drive box 31 are provided with a V-shaped opening 70, with a fourth piston and cylinder unit 71 mounted rigidly at its base. The unit 71 acts to displace a linkage 72, the front end of which carries a head 73, in a direction parallel to the axis 28. The head serves to grip toolholders 17, 17a, as will be explained in greater detail further below in connection with FIG. 7. The toolholder 17, 17a gripped by the head 73 can be displaced between a magazine position 74 and a gripper arm position 75.

In the operating position shown in FIG. 5, the third piston and cylinder unit 64 is in its extended position, and the arc-shaped portion 61 is in its closed position, so that a continuous lateral guide is formed for the outer path 60. The head 73 is positioned in the path of the toolholders 17, 17a, the head 73 being designed in such a manner that it does not hinder the passage of the toolholders 17, 17a, as will also be explained in greater detail further below in connection with FIG. 7.

The holder 18 of the gripper arm 20 is positioned in front of the opening 32, in the immediate proximity of the arc-shaped portion 61.

Now, if for example a toolholder 17a is to be transferred from the magazine position 74 into the gripper arm position 75, the operating processes initiated are those shown in FIG. 6.

To begin with, the third piston and cylinder unit 64 is actuated, i.e. retracted, whereby the scythe-shaped retaining part 62 is pivoted. Due to the great length of the retaining part 62, the arc-shaped portion 61 is pivoted out of the opening 32 along an almost tangential path 65 so that it does not get into contact with the holder 18 located immediately in front of it. This permits the holder 18 to be arranged at an extremely small distance before the holders 42 of the magazine 29—which are not shown in FIG. 5—so that the toolholders 17, 17a have to be transferred over a very small space only.

Once the arc-shaped portion 61 has cleared the opening 32, the fourth piston and cylinder unit 71 can be actuated, i.e. extended to cause the head 73 to transfer to toolholder 17, 17a from the magazine position 74 into the gripper arm position 75.

Immediately after completion of this transfer movement, the head 73 is retracted again, and the arc-shaped portion 61 returns into its initial position shown in FIG. 5 so that the conveyor chain 33 of the magazine 29 can continue its movement immediately thereafter.

Figure 7:
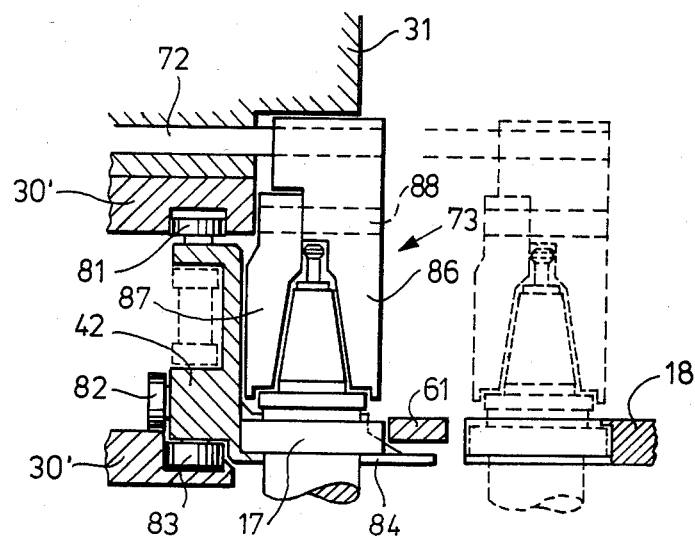
FIG. 7 shows a section along line VII—VII in FIG. 5, in enlarged scale, illustrating the transfer operation between the magazine and the gripper arm.

FIG. 7 shows once more the details of the situation as it exists during transfer of the toolholder 17.

First of all, it appears from FIG. 7 that the holders 42 of the magazine 29 are transferred, for example, by three rollers 81, 82, 83 in the magazine 29 or in its end 30', it being also possible to design one of the said rollers 81 to 83 as a swivel joint in the conveyor chain 33.

The toolholder 17 rests in a fork-shaped receiving opening 84 of the holder 42 which is offset laterally in such a manner that the toolholder 17 can be pushed into, and out of, the fork-shaped opening 84 in the manner of a drawer.

The head 73 comprises a rigid front portion 86 and a rear portion 87 which can be pivoted about an axis 88 extending in parallel to the direction of displacement of the head 73. The inside of the portions 86, 87 is adapted to the standardized outer contour of the taper of the toolholder 17, leaving however sufficient play.

The retracted position of the head 73 which is shown in full lines in FIG. 7 illustrates that the head 73 may be arranged in the path of the toolholder 17 even when the toolholders 17 are moved along the path by the conveyor chain 33. Now, when the toolholder 17 is to be transferred from the magazine 29 into the holder 18 of the gripper arm 20, as explained above with reference to FIGS. 5 and 6, the head 73 moves into the position shown in FIG. 7 in broken lines, and the rear portion 87 pushes the toolholder 17 into the likewise fork-shaped holder 18 of the gripper arm 20. The arc-shaped portion 61, of which a cross-section is shown in full lines in FIG. 7, is of course pivoted away in this case. The transfer of the toolholder 17 from the holder 18 of the gripper arm 20 into the holder 42 of the magazine 29 is effected analogously; in this case, the toolholder is pushed into the magazine 19 by the front portion 86 of the head 73.

Figure 8:
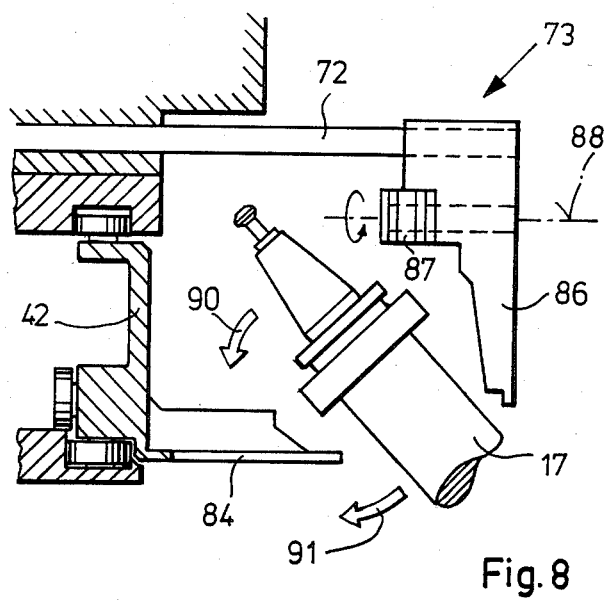
FIG. 8 is a representation similar to FIG. 7, illustrating the manual loading of a magazine according to the invention.

As has been mentioned before, the rear portion 87 can be pivoted in a plane perpendicular to the direction of displacement of the head 73. FIG. 8 illustrates that this permits the magazine 29 to be loaded manually. If the magazine 29 is to be emptied, or if a new set of toolholders intended for a new processing program is to be loaded, the head 73 is moved into its extended position shown in FIG. 8, while at the same time the associated gripper arm 20 is in its spindle position (left half of FIG. 1), i.e. in its remote position so that it does not obstruct the area of the opening 32. However, as in this position the rear portion 87 would hinder the loading or withdrawal of the toolholders 17, it can be pivoted about the axis 88 in the direction shown in FIG. 8 so that now there is sufficient room available for inserting the toolholder 17 into the fork-shaped opening 84 of the holder 42, in the direction indicated by the arrows 90, 91.

We claim:

1. Machine tool comprising a spindle stock, a tool magazine having an endless path along which a plurality of tool-carrying toolholders are displaceable in a plane perpendicular to the axis of the spindle stock, and two gripper arms for transferring the toolholders between withdrawal and/or loading positions in the tool magazine, which are located on opposite sides of the spindle stock, and a spindle position in a spindle nose of the spindle stock, wherein the said endless path extends along a U shape, said magazine being provided with a withdrawal or mounting position provided on each end of the legs of the said U, and the spindle nose is arranged in front of and below the said ends and rigidly connected with the said tool magazine in the direction of the axis.

2. Machine tool according to claim 1, wherein the axis of the said head stock and the said withdrawal or loading positions are provided in symmetrical arrangement at the ends of an isosceles triangle, and the transfer path of the said gripper arms extends along the equal sides of the triangle, the angular position of the toolholders remaining unchanged during the transfer movement.

3. Machine tool according to claim 1, wherein the said spindle stock can be moved along several coordinate axes, the said gripper arms are provided with a linkage in the form of a parallelogram and are rigidly connected with the said spindle stock in directions perpendicular to the latter's axis, but are movable in a direction parallel to the said axis.

4. Machine tool according to claim 1, wherein a conveyor chain is guided along the said endless path and provided with pivoted holders for the said toolholders, and two driving wheels for the conveyor chain, which are driven in synchronism, are arranged at the ends of the U.

5. Machine tool according to claim 4, wherein the said driving wheels are driven via an endless belt arranged in the form of a V, preferably a toothed belt or a chain, the said driving wheels being arranged at the free ends of the legs of the V, and an additional driver and a roller provided at a distance from the latter being arranged at the point of intersection of the said legs.

6. Machine tool according to claim 5, wherein the said roller takes the form of a tension pulley for the belt or the chain which can be displaced towards the said driver.

7. Machine tool according to claim 4, wherein the said driving wheels, the said driver, the said pulley and the said belt are arranged in a V-shaped drive box.

8. Machine tool according to claim 7, wherein the free ends of the said drive box carry the said magazine by the latter's free legs and the point of the V of the said drive box is fastened at the said spindle stock, the said drive box and the said magazine being preferably designed as self-supporting aluminium structures.

9. Machine tool according to claim 1, wherein the said toolholders are held on the U-shaped endless path of the said magazine in fork-like holders whose open sides point away from the U, a guide wall fixed to the said magazine extends along the endless path in front of the said open side, and the said guide is provided with an opening at each of the withdrawal and loading positions.

10. Machine tool according to claim 9, wherein the said opening is spanned by an arc-shaped portion forming the upper end of a scythe-shaped holding part which is mounted to pivot at its lower end.

11. Machine tool according to claim 1, wherein a slide arrangement fixed to the said magazine extends perpendicularly relative to the endless path at the withdrawal and loading positions, which slide arrangement serves for moving toolholders out of unilaterally open, fork-shaped holders of the said magazine into and out of a likewise fork-shaped holder of the gripper arm in the latter's magazine position.

12. Machine tool according to claim 11, wherein the said slide arrangement comprises a head having two portions arranged one behind the other in the direction of displacement and holding the toolholder positively in both directions of displacement.

13. Machine tool according to claim 12, wherein the head portion pointing away from the said gripper arm can be pivoted about an axis extending in parallel to the direction of displacement.

14. Machine tool according to claim 1, wherein the said magazine is surrounded by a wall which is closed all round, except for openings provided at the withdrawal and loading positions.

* * * * *